United States Patent
Schaefer

(10) Patent No.: US 11,028,232 B2
(45) Date of Patent: Jun. 8, 2021

(54) PROCESS FOR PREPARING SILOXANES CONTAINING OXAMIDO ESTER GROUPS

(71) Applicant: WACKER CHEMIE AG, Munich (DE)

(72) Inventor: Oliver Schaefer, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/955,517

(22) PCT Filed: Dec. 19, 2017

(86) PCT No.: PCT/EP2017/083535
§ 371 (c)(1),
(2) Date: Jun. 18, 2020

(87) PCT Pub. No.: WO2019/120484
PCT Pub. Date: Jun. 27, 2019

(65) Prior Publication Data
US 2020/0317868 A1    Oct. 8, 2020

(51) Int. Cl.
*C08G 77/26*   (2006.01)
*C07F 7/18*    (2006.01)
*C08G 77/04*   (2006.01)

(52) U.S. Cl.
CPC ............ *C08G 77/26* (2013.01); *C07F 7/1804* (2013.01); *C07F 7/188* (2013.01); *C08G 77/045* (2013.01)

(58) Field of Classification Search
CPC ..... C08G 77/26; C08G 77/045; C07F 7/1804; C07F 7/188
See application file for complete search history.

(56) References Cited

U.S. PATENT DOCUMENTS

| | | | | |
|---|---|---|---|---|
| 3,746,738 A * | 7/1973 | Marsden | ................ | C08G 69/42 528/26 |
| 6,569,521 B1 * | 5/2003 | Sheridan | ................. | C09J 7/22 428/343 |
| 7,705,101 B2 * | 4/2010 | Sherman | ................. | C08L 83/10 528/25 |
| 8,431,564 B2 * | 4/2013 | Timmers | .............. | C07D 471/04 514/210.21 |
| 9,499,479 B2 * | 11/2016 | Breslow | ............... | C07D 215/06 |
| 10,800,886 B2 * | 10/2020 | Schafer | .................. | C08G 77/26 |
| 2007/0149745 A1 * | 6/2007 | Leir | ....................... | C08G 77/54 528/38 |
| 2008/0318065 A1 * | 12/2008 | Sherman | ................. | C08L 23/06 428/446 |
| 2011/0071270 A1 * | 3/2011 | Hays | ..................... | C07C 251/66 528/33 |
| 2013/0011673 A1 * | 1/2013 | Hansen | ................ | C08G 77/452 428/355 R |
| 2014/0288119 A1 * | 9/2014 | Breslow | ............... | C07D 235/06 514/311 |
| 2015/0184023 A1 * | 7/2015 | Yalcin | .................... | B05D 3/007 138/146 |
| 2016/0002514 A1 * | 1/2016 | Determan | ............. | B32B 27/302 428/220 |
| 2017/0066712 A1 * | 3/2017 | Breslow | ................ | C07C 259/10 |
| 2019/0292365 A1 * | 9/2019 | Schaefer | ................. | C08L 83/10 |
| 2019/0315927 A1 * | 10/2019 | Schafer | .................. | C08G 77/08 |
| 2020/0231761 A1 * | 7/2020 | Hartmann-Thompson | | C08G 83/005 |

FOREIGN PATENT DOCUMENTS

| | | | | |
|---|---|---|---|---|
| EP | 0568147 A1 * | 11/1993 | ............. | C08G 77/54 |
| EP | 0568147 B1 | 7/1996 | | |
| EP | 1963404 B1 | 4/2011 | | |
| WO | WO-9946237 A1 * | 9/1999 | .............. | A61P 19/10 |
| WO | 2011090644 A2 | 7/2011 | | |
| WO | WO-2011090644 A2 * | 7/2011 | ........... | C08G 65/336 |
| WO | WO-2019043490 A1 * | 3/2019 | ............ | C08G 77/54 |
| WO | WO-2019120483 A1 * | 6/2019 | ............ | C07F 7/1804 |
| WO | WO-2020025100 A1 * | 2/2020 | ............ | C08G 77/26 |
| WO | WO-2020030288 A1 * | 2/2020 | ................ | C08J 3/03 |

OTHER PUBLICATIONS

A. Johnson et al., J. Chem. Soc. Perkin Trans. 1 (1996) (Year: 1996).*

* cited by examiner

*Primary Examiner* — Alexander R Pagano
(74) *Attorney, Agent, or Firm* — Brooks Kushman P.C.

(57) ABSTRACT

Oximido ester-functional siloxanes, including those with oxamido ester side chains, are produced by reacting an alkoxy oxamido ester silane with water, optionally in the presence of further alkoxy silanes.

11 Claims, No Drawings

PROCESS FOR PREPARING SILOXANES CONTAINING OXAMIDO ESTER GROUPS

CROSS REFERENCE TO RELATED APPLICATIONS

This application is the U.S. National Phase of PCT Appln. No. PCT/EP2017/083535 filed Dec. 19, 2017, the disclosure of which is incorporated in its entirety by reference herein.

BACKGROUND OF THE INVENTION

1. Field of the Invention

The invention relates to a method for preparing siloxanes having oxamidoester groups.

2. Description of the Related Art

The chemical group

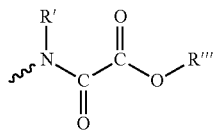

is often referred to as a 2-amino-2-oxoacetate or oxamide group or as an oxamidoester group, but the term oxamidoester shall be used to refer to this group hereinafter. The combination of the half-ester structure with an oxo group means that oxamidoesters have the advantage of being more reactive than amides or carbamates, especially when reacting with amines or alcohols. They are, however, appreciably more stable than isocyanate structures, for example they do not dimerize or trimerize and are appreciably less reactive, which makes reaction control with these groups much more straightforward.

Oxamidoester-functional polysiloxanes can be used in many fields of application, but especially in the preparation of block copolymers of thermoplastic siloxanes, as described for example in EP-A 1963404. The preparation of such oxamidoester-functional siloxanes is known in principle and described in USA 2007/0149745. This methodology uses as starting materials bisaminoalkyl-functional siloxanes, which can be prepared by various methods. These bisaminoalkyl-functional siloxanes are preferably reacted with dialkyl oxalates, which are present in excess, to form the desired substituted amino(oxo)acetate-functional siloxanes, hereinafter referred to simply as oxamidoester-functional siloxanes. Before these products can be reacted further, the excess dialkyl oxalate present in the reaction mixture normally also needs to be removed, which in this case is done primarily by batchwise vacuum distillation. There are, however, a few things about the described method that are disadvantageous. The degree of functionalization of the oxamidoester-functional siloxanes depends first and foremost on the degree of functionalization of the bis(aminoalkyl)siloxanes used as starting material, but these are very laborious to prepare with a functionality >99%. Moreover, in order to avoid side reactions it is necessary to use the added dialkyl oxalates in relatively large excesses, which in turn entails laborious and costly removal of these dialkyl oxalates, since these are sometimes toxic. A third major disadvantage is the fact that commercially available dialkyl oxalates such as diethyl oxalate contain impurities which, when reacted with bisamino-functional siloxanes, lead to products that are sometimes very intensely colored, and which have to be laboriously decolorized in a further step if further use requires optically clear and colorless products. The availability of appropriate aminosiloxane precursors is a prerequisite for the preparation of oxamidoester-functional siloxanes of varying chain length. However, what is probably the biggest disadvantage of this method is that it is almost impossible to prepare siloxanes bearing an oxamidoester function in a side chain in an industrial process, because the reaction of two lateral amine groups with one molecule of diethyl oxalate leads to chain-extension products and thus to products that are partially crosslinked. This reaction can be suppressed only by unrealistically high excesses of oxalic esters, the removal of which would make the synthesis of these compounds uneconomical. Consequently, compounds bearing oxalate groups in the side chain have not been described up to now.

The problem addressed is therefore that of overcoming the disadvantages of the prior art.

SUMMARY OF THE INVENTION

The invention thus provides a method for preparing siloxanes having oxamidoester groups by reacting (A) Silanes of the General Formula

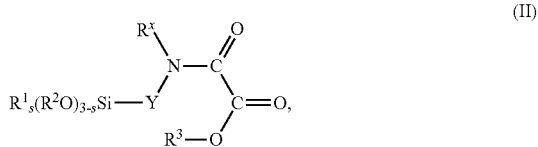

optionally (B) silanes of the general formula $$R^4_t(R^5O)_{4-t}Si \quad (III)$$

and (W) water, where $R^1$ are monovalent, optionally substituted, SiC-bonded hydrocarbon radicals that may be interrupted by heteroatoms, $R^2$ are hydrogen or monovalent, optionally substituted hydrocarbon radicals that may be interrupted by heteroatoms, $R^3$ are optionally substituted hydrocarbon radicals that may be interrupted by oxygen atoms, $R^x$ are hydrogen or optionally substituted hydrocarbon radicals, Y are divalent, optionally substituted hydrocarbon radicals that may be interrupted by oxygen atoms or nitrogen atoms, $R^4$ are monovalent, optionally substituted, SiC-bonded hydrocarbon radicals that may be interrupted by heteroatoms, $R^5$ are hydrogen or monovalent, optionally substituted hydrocarbon radicals that may be interrupted by heteroatoms, s is 0, 1 or 2, and t is 0, 1, 2 or 3.

DETAILED DESCRIPTION OF THE PREFERRED EMBODIMENTS

The invention provides a method for preparing siloxanes having oxamidoester groups by reacting (A) Silanes of the General Formula

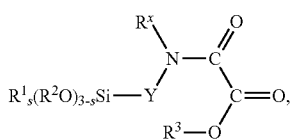

optionally (B) silanes of the general formula

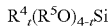 (III)

and (W) water,
where
$R^1$ may independently be identical or different and represents monovalent, optionally substituted, SiC-bonded hydrocarbon radicals that may be interrupted by heteroatoms,
$R^2$ may independently be identical or different and represents a hydrogen atom or monovalent, optionally substituted hydrocarbon radicals that may be interrupted by heteroatoms,
$R^3$ represents monovalent, optionally substituted hydrocarbon radicals that may be interrupted by oxygen atoms,
$R^x$ represents a hydrogen atom or optionally substituted hydrocarbon radicals,
Y represents divalent, optionally substituted hydrocarbon radicals that may be interrupted by oxygen atoms or nitrogen atoms,
$R^4$ may independently be identical or different and represents monovalent, optionally substituted, SiC-bonded hydrocarbon radicals that may be interrupted by heteroatoms,
$R^5$ may independently be identical or different and represents a hydrogen atom or monovalent, optionally substituted hydrocarbon radicals that may be interrupted by heteroatoms,
s is 0, 1 or 2, preferably 1 or 2, and
t is 0, 1, 2 or 3, preferably 2 or 3.
Examples of hydrocarbon radicals $R^1$ are alkyl radicals such as the methyl, ethyl, n-propyl, isopropyl, n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as o-, m-, p-tolyl radicals, xylyl radicals and ethylphenyl radicals; or aralkyl radicals such as the benzyl radical or α- and β-phenylethyl radicals.
Examples of substituted hydrocarbon radicals $R^1$ are halogenated hydrocarbon radicals such as the chloromethyl, 3-chloropropyl, 3-bromopropyl, 3,3,3-trifluoropropyl, and 5,5,5,4,4,3,3-heptafluoropentyl radical and also the chlorophenyl radical; hydroxyalkyl radicals such as the hydroxypropyl radical; or epoxy radicals such as the glycidyloxypropyl radical.
The radicals $R^1$ are preferably monovalent, SiC-bonded hydrocarbon radicals having 1 to 20 carbon atoms, optionally substituted with halogen atoms or hydroxy groups, which may be interrupted by oxygen atoms, preferably monovalent hydrocarbon radicals having 1 to 6 carbon atoms, more preferably monovalent aliphatic hydrocarbon radicals having 1 to 6 carbon atoms, in particular the methyl, ethyl or propyl radical, most preferably the methyl radical.
Examples of radicals $R^2$ are the radicals listed for radicals $R^1$ and also polyalkylene glycol radicals bonded via a carbon atom.
The radicals $R^2$ are preferably hydrogen or monovalent, optionally substituted hydrocarbon radicals that may be interrupted by oxygen atoms, more preferably monovalent hydrocarbon radicals having 1 to 6 carbon atoms, in particular the methyl, ethyl or propyl radical.
Examples of radicals $R^3$ are the radicals listed for radicals $R^1$ and also polyalkylene glycol radicals bonded via a carbon atom.
The radicals $R^3$ are preferably monovalent, optionally substituted hydrocarbon radicals that may be interrupted by oxygen atoms, more preferably monovalent hydrocarbon radicals having 1 to 6 carbon atoms, in particular the methyl, ethyl or propyl radical.
Examples of radicals $R^4$ are the radicals listed for radicals $R^1$.
The radicals $R^4$ are preferably monovalent, SiC-bonded hydrocarbon radicals having 1 to 20 carbon atoms, optionally substituted with halogen atoms or hydroxy groups, and which may be interrupted by oxygen atoms, preferably monovalent hydrocarbon radicals having 1 to 6 carbon atoms, more preferably monovalent aliphatic hydrocarbon radicals having 1 to 6 carbon atoms, in particular the methyl, ethyl or propyl radical, most preferably the methyl radical.
Examples of radicals $R^5$ are the radicals listed for radicals $R^2$.
The radicals $R^5$ are preferably hydrogen or monovalent, optionally substituted hydrocarbon radicals that may be interrupted by oxygen atoms, more preferably hydrogen or monovalent hydrocarbon radicals having 1 to 6 carbon atoms, in particular hydrogen or methyl, ethyl or propyl radicals.
Examples of radicals $R^x$ are hydrogen or the radicals listed for radicals $R^1$.
The radicals $R^x$ are preferably a hydrogen
or monovalent hydrocarbon radicals optionally substituted with —CN or -halogen, preferably hydrogen or alkyl groups, more preferably hydrogen or linear alkyl groups having 1 to 6 carbon atoms, and in particular hydrogen, or methyl or ethyl radicals, most preferably, hydrogen.
Examples of radicals Y are alkylene radicals such as the methylene, ethylene, n-propylene, isopropylene, n-butylene, isobutylene, tert-butylene, n-pentylene, isopentylene, and tertpentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; and cycloalkylene radicals such as cyclopentylene, cyclohexylene, cycloheptylene radicals and methylcyclohexylene radicals. Further examples of the radical Y are heteroalkylene radicals, for example heteroalkylene radicals interrupted by nitrogen such as the ethylaminopropyl radical.
The radicals Y are preferably alkylene radicals or heteroalkylene radicals, optionally substituted with halogen atoms, preferably with fluorine or chlorine, more preferably alkylene radicals having 1 to 6 carbon atoms, yet more preferably methylene, propylene or butylene radicals, and in particular the n-propylene radical.

The oxamidoester-containing siloxanes prepared according to the invention may be present in linear form, in cyclic form or in branched or crosslinked form.

Examples of compounds (A) of the formula (II) used according to the invention are those in which $R^1$=—$CH_3$; $R^2$=—$CH_3$; $R^3$=—$CH_2CH_3$, $R^x$=—H; Y=—$(CH_2)_3$—; s=2,
$R^1$=—$CH_3$; $R^2$=—$CH_2CH_3$; $R^3$=—$CH_2CH_3$; $R^x$=—H; Y=—$(CH_2)_3$—; s=2,
$R^1$=—$CH_3$; $R^2$=—$CH_2CH_3$; $R^3$=—$CH_3$; $R^x$=—H; Y=—$(CH_2)_3$—; s=2,
$R^1$=—$CH_3$; $R^2$=—$CH_3$; $R^3$=—$CH_2CH_3$; $R^x$=—H; Y=—$(CH_2)_3$—; s=1,
$R^1$=—$CH_3$; $R^2$=—$CH_2CH_3$; $R^3$=—$CH_2CH_3$; $R^x$=—H; Y=—$(CH_2)_3$—; s=1,
$R^1$=—$CH_3$; $R^2$=—$CH_2CH_3$; $R^3$=—$CH_3$; $R^x$=—H; Y=—$(CH_2)_3$—; s=1,
$R^1$=—$CH_3$; $R^3$=—$CH_2CH_3$; $R^x$=—H; Y=—$(CH_2)_3$—; s=3,
$R^1$=—$CH_3$; $R^3$=—$CH_3$; $R^x$=—H; Y=—$(CH_2)_3$—; s=3,
$R^1$=—$CH_3$; $R^2$=—$CH_3$; $R^3$=—$CH_2CH_3$; $R^x$=—H; Y=—$(CH_2)$—; s=2,
$R^1$=—$CH_3$; $R^2$=—$CH_2CH_3$; $R^3$=—$CH_2CH_3$; $R^x$=—H; Y=—$(CH_2)$—; s=2,
$R^1$=—$CH_3$; $R^2$=—$CH_2CH_3$; $R^3$=—$CH_3$; $R^x$=—H; Y=—$(CH_2)$—; s=2,
$R^1$=—$CH_3$; $R^2$=—$CH_3$; $R^3$=—$CH_2CH_3$; $R^x$=—H; Y=—$(CH_2)$—; s=2,
$R^1$=—$C_6H_5$; $R^2$=—$CH_2CH_3$; $R^3$=—$CH_2CH_3$; $R^x$=—H; Y=—$(CH_2)$—; s=2, and
$R^1$=—$C_6H_5$; $R^2$=—$CH_2CH_3$; $R^3$=—$CH_3$; $R^x$=—H; Y=—$(CH_2)$—; s=2.

The compounds of the formula (II) used according to the invention are preferably aliphatic, monoalkoxy- or dialkoxy-based oxamidoester-functional silanes.

The compounds of the formula (II) used according to the invention are preferably colorless, air-stable compounds that are stable in the absence of water, more preferably colorless compounds.

The compounds of the formula (II) are commercially available products or they may be prepared by methods that are standard in silicon chemistry.

Examples of compounds of the formula (III) used according to the invention are dimethoxydimethylsilane, diethoxydimethylsilane, dihydroxydimethylsilane, hydroxytrimethoxysilane, methoxytrimethylsilane, dimethoxydiphenylsilane, dimethoxymethylphenylsilane, dihydroxydiphenylsilane, dihydroxymethylphenylsilane, vinyltrimethoxysilane, methyltrimethoxysilane, tetramethoxysilane or tetraethoxysilane.

The compounds of the formula (III) used according to the invention are preferably dimethoxydimethylsilane, hydroxytrimethylsilane or methoxytrimethylsilane, more preferably dimethoxydimethylsilane and hydroxytrimethylsilane.

The compounds of the formula (III) are commercially available products or they can be prepared by methods that are standard in silicon chemistry.

If silanes of the formula (III) are used, the weight ratio between the silanes (III) and the silanes of the formula (II) may in the method according to the invention vary within wide ranges and is determined primarily by the desired molecular weight of the compounds that are to be prepared by the method of the invention.

If silanes of the formula (III) are used in the method of the invention, the amounts used are preferably 10 to 1000 parts by weight, more preferably 30 to 300 parts by weight, in each case based on 100 parts by weight of component (II). In the method of the invention, silanes of the formula (III) are preferably used.

Examples of component (W) are natural waters such as rain water, groundwater, spring water, river water, and sea water, chemical waters such as demineralized water, distilled water or (multiply) redistilled water, water for medical or pharmaceutical purposes such as purified water (aqua purificata; Pharm. Eur. 3), aqua deionisata, aqua destillata, aqua bidestillata, aqua ad injectionam or aqua conservata, drinking water according to the German Drinking Water Ordinance, and mineral water.

In the method according to the invention, water (W) is used in amounts of preferably 0.4 to 10 times molar excess, more preferably 0.8 to 3 times molar excess, in each case based on the total number of reactive —$OR^2$ and —$OR^5$ groups in the silanes (A) and optionally (B) used, where $R^2$ and $R^5$ are as defined above.

In addition to components (A), optionally (B) and (W), further components may be used in the method of the invention, for example catalysts (C) and organic solvents (D).

The optional catalysts (C) may be the same catalysts as have been used in previously described equilibration or condensation methods, such as strong acids or strong bases. The catalysts (C) used may be in solid form under the conditions of the method or they may be liquid.

The optional catalysts (C) are preferably strong acids such as HCl, sulfuric acid, sulfonic acids or also phosphonitrilic chlorides ($PNCl_2$) or oligomeric or polymeric analogs thereof, or also strong bases such as NaOH, KOH, CsOH, RbOH, ammonium hydroxides or metal alkoxides.

If catalysts (C) are used, they are preferably present in amounts of 10 to 10,000 ppm by weight, more preferably 10 to 2000 ppm by weight, in each case based on the total amount of components (A) and (B). In the method according to the invention, preference is given to using no catalysts (C).

The method according to the invention may be carried out in the presence or in the absence of solvents (D). If solvents (D) are used, they are preferably solvents or solvent mixtures having a boiling range of 80 to 160° C. at 0.1 MPa. The term solvent does not mean that all reaction components are able to dissolve in it. The presence of solvents (D) may be for purposes including reducing the viscosity of the desired end products so that they may be conveyed or pumped more easily by technical means.

Preferred examples of aprotic solvents (D) optionally used are aliphatic hydrocarbons such as hexane, heptane or decane, aromatic hydrocarbons such as toluene or xylene, and also ethers such as tetrahydrofuran (THF), diethyl ether and methyl tert-butyl ether (MTBE), ketones such as acetone or 2-butanone or alcohols such as ethanol or methanol.

If solvents (D) are used in the method of the invention, the amount should preferably be sufficient to ensure adequate homogenization of the reaction mixture.

If solvents (D) are used in the method of the invention, the amounts are preferably 20% to 80% by weight, more preferably 20% to 50% by weight, in each case based on the total weight of all components used. In the method according to the invention, preference is given to using no solvent (D).

In the method according to the invention, the proportion of components (A) to (D) in the total amount of substances used is preferably not less than 90% by weight, more preferably not less than 95% by weight.

In the method according to the invention, preference is given to using no further constituents other than components (A) to (D) and any impurities arising from the preparation thereof.

In the method according to the invention, the starting materials used may be mixed with one another in any desired and previously known manner. Although the order in which the constituents (A), optionally (B), optionally (C), and optionally (D) and also water (W) are mixed is not critical, when using a catalyst (C) it has proven useful in practice for this to be added to the mixture of the other constituents preferably last. To make it easier in particular to meter in the catalyst (C) correctly, the catalyst (C) may also be added as a premix in a solvent (D) or in one of components (A) or (B), preferably in component (B) if this is being used.

Once the reaction has taken place, the resulting product mixture is worked up in a manner known per se. The removal of unreacted starting materials such as water, or any condensation products such as alcohols, or by-products such as cyclic, non-functional siloxanes, is carried out preferably at elevated temperature and/or reduced pressure. In addition, once the reaction according to the invention has ended, the catalysts (C) optionally used may, depending on the nature, amount used or intended use of the end product, remain in the end product in neutralized or non-neutralized form or they may be neutralized and optionally filtered off by known methods, for example by filtration or by adsorption on basic oxides such as aluminum oxide, magnesium oxide or basic salts such as carbonates or hydrogen carbonates.

The amounts of cyclic, non-functional siloxane products possibly remaining in the product mixture obtained according to the invention are preferably below 1% by weight, more preferably below 0.5% by weight, most preferably below 0.1% by weight. The removal in particular of low-molecular-weight cyclic siloxanes of the general formula

$$[R^4_2Si-O]_n \qquad (IV)$$

in which n=3 to 5, may be carried out by means of a downstream continuous or batchwise vacuum distillation at the temperatures and pressures known in the prior art.

In a preferred embodiment of the method according to the invention, (A) silanes of the formula (II), where $R^1$ is a methyl radical, $R^x$ is a hydrogen atom, Y is $-C_3H_6-$, s is 1 or 2, $R^2$ is a methyl or ethyl radical, and $R^3$ is an ethyl radical, are reacted, in the absence of catalyst (C), with (B) silanes of the formula (III), where $R^4$ is a methyl radical and $R^5$ is a methyl or ethyl radical and t is 2 or 3.

The components used in the method of the invention may in each case be a single type of the component concerned or may be a mixture of two or more types of the component in question.

The method according to the invention is carried out preferably under an inert gas such as nitrogen or argon, more preferably under nitrogen.

The choice of a suitable reactor for carrying out the method of the invention is essentially determined by the viscosity of the starting materials used and the viscosity of the expected product. In addition to classic stirred-tank reactors, other apparatus such as kneaders may be used to carry out the method, including for high-molecular-weight products.

The method according to the invention is preferably carried out at temperatures between 0 and 250° C., more preferably between 20 and 150° C., most preferably between 20 and 90° C. The method according to the invention is at the same time preferably carried out at pressures between 10 hPa and 2000 hPa, but more preferably at pressures between 100 hPa and 1100 hPa, and in particular at ambient pressure, i.e. at 900 to 1100 hPa.

The method according to the invention may be carried out in a batchwise, semi-continuous or completely continuous process, preferably in a batchwise process.

The method according to the invention affords siloxanes comprising units of the formula

$$X_aR_b(R^6O)_cSiO_{4-a-b-c/2} \qquad (I)$$

where
R may be identical or different and is as defined above for radical $R^1$,
$R^6$ may be identical or different and is as defined above for radical $R^2$,
X represents a radical

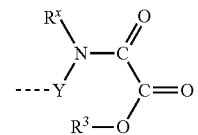

where $R^x$, Y, and $R^3$ are as defined above,
a is 0 or 1,
b is 0, 1, 2 or 3, and
c is 0, 1, 2 or 3,
with the proviso that the sum a+b+c is less than or equal to 3 and each molecule contains at least one radical X.

The invention further provides siloxanes comprising units of the formula

$$X_aR_b(R^6O)_cSiO_{4-a-b-c/2} \qquad (I),$$

where
R may be identical or different and is as defined above for radical $R^1$,
$R^6$ may be identical or different and is as defined above for radical $R^2$,
X represents a radical

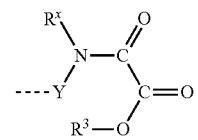

where $R^x$, Y, and $R^3$ are as defined above,
a is 0 or 1,
b is 0, 1, 2 or 3, and
c is 0, 1, 2 or 3,
with the proviso that the sum a+b+c is less than or equal to 3 and each molecule contains at least one unit of the formula (I), where a is 1 and the sum b+c is 0 or 1.

The siloxanes according to the invention or prepared according to the invention preferably comprise from 2 to 1000 silicon atoms, more preferably from 2 to 100 silicon atoms, and most preferably from 2 to 50 silicon atoms. The siloxanes of compound (I) are preferably cyclic or linear, but most preferably linear.

The siloxanes according to the invention or prepared according to the invention preferably consist of only units of the formula (I).

In the siloxanes according to the invention or prepared according to the invention, the sum a+b+c is preferably 2 in at least 50% of the units of the formula (I).

Examples of compounds of the general formula (I) prepared according to the invention are Et—O—CO—CO—NH—$C_3H_6$—SiMe$_2$-[OSiMe$_2$]$_{10}$-O—SiMe$_2$-$C_3H_6$—NH—CO—CO—O-Et, Me—O—CO—CO—NH—$C_3H_6$—SiMe$_2$-[OSiMe$_2$]$_{10}$-O—SiMe$_2$-$C_3H_6$—NH—CO—CO—O-Et, Me—O—CO—CO—NH—$C_3H_6$—SiMe$_2$-[OSiMe$_2$]$_{10}$-O—SiMe$_2$-$C_3H_6$—NH—CO—CO—O-Me, Et—O—CO—CO—NH—$C_3H_6$—SiMe$_2$-[OSiMe$_2$]$_4$-O—SiMe$_2$-$C_3H_6$—NH—CO—CO—O-Et, Me—O—CO—CO—NH—$C_3H_6$—SiMe$_2$-[OSiMe$_2$]$_4$-O—SiMe$_2$-$C_3H_6$—NH—CO—CO—O-Et, Me—O—CO—CO—NH—$C_3H_6$—SiMe$_2$-[OSiMe$_2$]$_4$-O—SiMe$_2$-$C_3H_6$—NH—CO—CO—O-Me, Et—O—CO—CO—NH—$C_3H_6$—SiMe$_2$-[OSiMe$_2$]$_2$-O—SiMe$_2$-$C_3H_6$—NH—CO—CO—O-Et, Me—O—CO—CO—NH—$C_3H_6$—SiMe$_2$-[OSiMe$_2$]$_2$-O—SiMe$_2$-$C_3H_6$—NH—CO—CO—O-Et, Me—O—CO—CO—NH—$C_3H_6$—SiMe$_2$-[OSiMe$_2$]$_2$-O—SiMe$_2$-$C_3H_6$—NH—CO—CO—O-Me, Et—O—CO—CO—NH—$C_3H_6$—SiMe$_2$-O—SiMe$_2$-$C_3H_6$—NH—CO—CO—O-Et, Me—O—CO—CO—NH—$C_3H_6$—SiMe$_2$-O—SiMe$_2$-$C_3H_6$—NH—CO—CO—O-Et, Me—O—CO—CO—NH—$C_3H_6$—SiMe$_2$-O—SiMe$_2$-$C_3H_6$—NH—CO—CO—O-Me, Et—O—CO—CO—NH—$C_2H_4$—NH—$C_3H_6$—SiMe$_2$-[OSiMe$_2$]$_2$-SiMe$_2$-$C_3H_6$—NH—$C_2H_4$—NH—CO—CO—O-Et, Et—O—CO—CO—NH—$C_2H_4$—NH—$C_3H_6$—SiMe$_2$-[OSiMe$_2$]$_4$-O—SiMe$_2$-$C_3H_6$—NH—$C_2H_4$—NH—CO—CO—O-Et, Et—O—CO—CO—NH—$C_3H_6$—SiMe$_2$-[OSiMe$_2$]$_{10}$-[OSiMe-$C_3H_6$—NH—CO—CO—O-Et]$_1$-O—SiMe$_2$-$C_3H_6$—NH—CO—CO—O-Et, Et—O—CO—CO—NH—$C_3H_6$—SiMe$_2$-[OSiMe$_2$]$_{10}$-[OSiMe-$C_3H_6$—NH—CO—CO—O-Et]$_2$-O—SiMe$_2$-$C_3H_6$—NH—CO—CO—O-Et, Et—O—CO—CO—NH—$C_3H_6$—SiMe$_2$-[OSiMe$_2$]$_{10}$-[OSiMe-$C_3H_6$—NH—CO—CO—O-Et]$_3$-O—SiMe$_2$-$C_3H_6$—NH—CO—CO—O-Et, Me—O—CO—CO—NH—$C_3H_6$—SiMe$_2$-[OSiMe$_2$]$_{10}$-[OSiMe-$C_3H_6$—NH—CO—CO—O-Et]$_1$-O—SiMe$_2$-$C_3H_6$—NH—CO—CO—O-Me, Me—O—CO—CO—NH—$C_3H_6$—SiMe$_2$-[OSiMe$_2$]$_{10}$-[OSiMe-$C_3H_6$—NH—CO—CO—O-Et]2-O—SiMe$_2$-$C_3H_6$—NH—CO—CO—O-Me, Me—O—CO—CO—NH—$C_3H_6$—SiMe$_2$-[OSiMe$_2$]$_{10}$-[OSiMe-$C_3H_6$—NH—CO—CO—O-Et]$_3$-O—SiMe$_2$-$C_3H_6$—NH—CO—CO—O-Me, Me$_3$Si—[OSiMe$_2$]$_{10}$-[OSiMe-$C_3H_6$—NH—CO—CO—O-Et]$_1$-O—SiMe$_2$-$C_3H_6$—NH—CO—CO—O-Et, Me$_3$Si—[OSiMe$_2$]$_{10}$-[OSiMe-$C_3H_6$—NH—CO—CO—O-Et]$_2$-O—SiMe$_2$-$C_3H_6$—NH—CO—CO—O-Et, Me$_3$Si—[OSiMe$_2$]$_{10}$-[OSiMe-$C_3H_6$—NH—CO—CO—O-Et]$_3$-O—SiMe$_2$-$C_3H_6$—NH—CO—CO—O-Et, Me$_3$Si—[OSiMe$_2$]$_{10}$-[OSiMe-$C_3H_6$—NH—$C_2H_4$—NH—CO—CO—O-Et]$_1$-O—SiMe$_2$-$C_3H_6$NH—CO—CO—O-Et, Me$_3$Si—[OSiMe$_2$]$_{10}$-[OSiMe-$C_3H_6$—NH—$C_2H_4$—NH—CO—CO—O-Et]$_2$-O—SiMe$_2$-$C_3H_6$NH—CO—CO—O-Et, Me$_3$Si—[OSiMe$_2$]$_{10}$-[OSiMe-$C_3H_6$—NH—$C_2H_4$—NH—CO—CO—O-Et]$_3$-O—SiMe$_2$-$C_3H_6$NH—CO—CO—O-Et, Me$_3$Si—[OSiMe$_2$]$_{10}$-[OSiMe-$C_3H_6$—NH—CO—CO—O-Et]$_1$-O—SiMe$_3$, Me$_3$Si—[OSiMe$_2$]$_{10}$-[OSiMe-$C_3H_6$—NH—CO—CO—O-Et]$_2$-O—SiMe$_3$, Me$_3$Si—[OSiMe$_2$]$_{10}$-[OSiMe-$C_3H_6$—NH—CO—CO—O-Et]$_3$-O—SiMe$_3$, Me$_3$Si—[OSiMe$_2$]$_{10}$-[OSiMe-$C_3H_6$—NH—$C_2H_4$—NH—CO—CO—O-Et]$_1$-O—SiMe$_3$, Me$_3$Si—[OSiMe$_2$]$_{10}$-[OSiMe-$C_3H_6$—NH—$C_2H_4$—NH—CO—CO—O-Et]$_2$-O—SiMe$_3$, Me$_3$Si—[OSiMe$_2$]$_{10}$-[OSiMe-$C_3H_6$—NH—$C_2H_4$—NH—CO—CO—O-Et]$_3$-O—SiMe$_3$, Me$_3$Si—[OSiMe$_2$]$_{10}$-[OSiMe-$C_3H_6$—NH—CO—CO—O-Me]$_1$-O—SiMe$_3$, Me$_3$Si—[OSiMe$_2$]$_{10}$-[OSiMe-$C_3H_6$—NH—CO—CO—O-Me]$_2$-O—SiMe$_3$, and Me$_3$Si—[OSiMe$_2$]$_{10}$-[OSiMe-$C_3H_6$—NH—CO—CO—O-Me]$_3$-O—SiMe$_3$, wherein Me represents a methyl radical and Et an ethyl radical.

The siloxanes prepared according to the invention preferably have an APHA color index of 0 to 100, more preferably 0 to 20, most preferably 0 to 10.

In the context of the present invention, the determination of the APHA index in accordance with DIN ISO 6271-2 is preferably carried out using a Lico 500 instrument from Hach-Lange. The measured APHA index takes account not only of the color, but of the turbidity of the measured product.

The siloxanes prepared according to the invention preferably have an average molecular weight Mn (number average) of 263 g/mol to 10,000 g/mol, more preferably 420 g/mol to 5000 g/mol, and most preferably 448 to 4000 g/mol.

In the context of the present invention, the number-average molecular weight Mn is determined by size-exclusion chromatography (SEC) against a polystyrene standard in THF at 60° C. with a flow rate of 1.2 ml/min and detection with a RI (refractive index) detector on a Styragel HR3-HR4-HR5-HR5 column set from Waters Corp. USA with an injection volume of 100 µl.

Alternatively, the number-average molecular weight Mn may also be determined by evaluating a $^1$H or $^{29}$Si NMR spectrum through integration of the terminal groups and of other functional groups.

The average molecular weight (number average) of the end product is here determined primarily by the ratio of the starting materials used according to the invention in the individual case.

The method according to the invention has the advantage that it can be carried out easily and quickly and with the use of simple starting products.

The method according to the invention has the advantage that siloxanes having oxamidoester groups are obtained in high purity, in particular without turbidity and without a yellow coloration.

The method according to the invention has the further advantage that easily obtainable, inexpensive and easy-to-process starting materials may be used here.

The method according to the invention has the advantage that siloxanes having oxamidoester groups and having a high degree of functionalization that can be selectively fine-tuned are obtained.

The method according to the invention likewise has the advantage that it can be used to obtain siloxanes having oxamidoester groups in which the desired oxamidoester group is in the side chain.

The method according to the invention affords functional siloxanes that may, for example, be used for coating fibers such as wool, cotton or textiles or for coating leather goods or as a lubricant in machine construction. In addition, the functional siloxanes according to the invention or prepared according to the invention may also be used in the production or modification of polymers.

In the examples described below, all parts and percentages are by weight unless otherwise stated. In addition, all viscosity data refer to a temperature of 25° C. Unless otherwise stated, the examples described below are carried out at ambient pressure, i.e. about 1010 hPa, and at room temperature, i.e. about 20° C., or at the temperature attained on mixing the reactants at room temperature without additional heating or cooling.

The examples described below are carried out in the presence of nitrogen as inert gas.

The molecular weights given in the examples are number-average molecular weights. The content of by-products and average molecular weights are evaluated by NMR spectroscopy. The mean chain length, residual Si—OH contents, and, if appropriate, cycle contents are determined by $^{29}$Si-NMR spectroscopy and the ratios between the oxamidoester groups and alkyl groups in the siloxane backbone is determined by $^{1}$H-NMR.

Me represents a methyl radical.
The following starting materials are used:
Silane 1: Dimethoxydimethylsilane (120.22 g/mol)
Silane 2:
Ethyl 2-((3-(diethoxy(methyl)silyl)propyl)amino)-2-oxoacetate
EtO—CO—CO—HN—CH$_2$CH$_2$CH$_2$—Si-Me(EtO)$_2$ (291.42 g/mol)

Silane 3:
Ethyl 2-((3-(methoxydimethylsilyl)propyl)amino)-2-oxoacetate
EtO—CO—CO—HN—CH$_2$CH$_2$CH$_2$—Si-Me$_2$(MeO) (247.36 g/mol)
Silane 4:
Ethyl 2-((3-(ethoxydimethylsilyl)propyl)amino)-2-oxoacetate
EtO—CO—CO—HN—CH$_2$CH$_2$CH$_2$—Si-Me$_2$(EtO) (261.39 g/mol)
Silane 5: Trimethylsilanol (90.20 g/mol)

Example 1

To 43.6 g (176 mmol) of silane 3 in a 250 ml 3-necked round-bottomed flask equipped with stirrer, internal thermometer, and reflux condenser was added at 22° C., with stirring, 6.4 g (353 mmol) of water and the mixture was heated to 50° C. After 5 hours, the excess water and the alcohol formed were removed on a rotary evaporator at a pressure of 10 hPa, affording 37.3 g of a bisoxamidoester-propyl-terminated disiloxane as a clear, viscous liquid (512 mPas).

Examples 2 to 17

In an analogous manner to the procedure described in example 1, the silanes 1 to 5 used were successively mixed with one another at 22° C., with stirring, in the amounts shown in table 1 in a 250 ml 3-necked round-bottomed flask equipped with stirrer, internal thermometer, and reflux condenser. The appropriate amounts of water were then added dropwise with stirring over a period of 30 minutes and the resulting mixture was heated to 50° C. After 5 h, the excess water and the alcohol formed were removed on a rotary evaporator at a pressure of 10 hPa, affording siloxanes having the properties shown in table 2.

TABLE 1

| | Silane 1 | | Silane 2 | | Silane 3 | | Silane 4 | | Silane 5 | | Water | |
|---|---|---|---|---|---|---|---|---|---|---|---|---|
| Example | [mmol] | [g] | [mmol] | [g] | [mmol] | [g] | [mmol] | [g] | [mmol] | [g] | [mmol] | [g] |
| 1 | 0 | 0.0 | 0 | 0.0 | 176 | 43.6 | 0 | 0.0 | 0 | 0.0 | 353 | 6.4 |
| 2 | 0 | 0.0 | 138 | 40.1 | 0 | 0.0 | 0 | 0.0 | 0 | 0.0 | 551 | 9.9 |
| 3 | 105 | 12.6 | 0 | 0.0 | 105 | 26.0 | 0 | 0.0 | 0 | 0.0 | 631 | 11.4 |
| 4 | 150 | 18.0 | 0 | 0.0 | 75 | 18.5 | 0 | 0.0 | 0 | 0.0 | 749 | 13.5 |
| 5 | 190 | 22.8 | 0 | 0.0 | 47 | 11.8 | 0 | 0.0 | 0 | 0.0 | 856 | 15.4 |
| 6 | 220 | 26.4 | 0 | 0.0 | 27 | 6.8 | 0 | 0.0 | 0 | 0.0 | 934 | 16.8 |
| 7 | 72 | 8.6 | 72 | 20.9 | 0 | 0.0 | 0 | 0.0 | 72 | 7.5 | 719 | 12.9 |
| 8 | 134 | 16.1 | 67 | 19.5 | 0 | 0.0 | 0 | 0.0 | 0 | 0.0 | 803 | 14.5 |
| 9 | 177 | 21.2 | 44 | 12.9 | 0 | 0.0 | 0 | 0.0 | 0 | 0.0 | 884 | 15.9 |
| 10 | 117 | 14.0 | 58 | 17.0 | 0 | 0.0 | 0 | 0.0 | 51 | 5.3 | 760 | 13.7 |
| 11 | 113 | 13.5 | 56 | 16.4 | 0 | 0.0 | 0 | 0.0 | 56 | 5.9 | 789 | 14.2 |
| 12 | 161 | 19.4 | 40 | 11.7 | 0 | 0.0 | 0 | 0.0 | 35 | 3.6 | 847 | 15.3 |
| 13 | 157 | 18.9 | 39 | 11.5 | 0 | 0.0 | 0 | 0.0 | 39 | 4.1 | 865 | 15.6 |
| 14 | 97 | 11.7 | 48 | 14.1 | 48 | 12.0 | 0 | 0.0 | 0 | 0.0 | 679 | 12.2 |
| 15 | 141 | 17.0 | 35 | 10.3 | 35 | 8.7 | 0 | 0.0 | 0 | 0.0 | 778 | 14.0 |
| 16 | 0 | 0.0 | 0 | 0.0 | 0 | 0.0 | 168 | 44.0 | 0 | 0.0 | 333 | 6.0 |
| 17 | 0 | 0.0 | 0 | 0.0 | 98 | 24.3 | 66 | 17.3 | 0 | 0.0 | 467 | 8.4 |

TABLE 2

| Example | Molecular weight Mn [g/mol] | Oxamidoester groups | Alkyl groups per oxamidoester group | Alkoxy groups per oxamidoester group | Viscosity [mPas] | Yield [g] | Appearance |
|---|---|---|---|---|---|---|---|
| 1 | n.d. | 1 | 2 | 0 | 512 | 37.3 | Clear colorless liquid |
| 2 | 903 | 1 | 3 | 0.08 | 507 | 28.3 | Clear colorless liquid |
| 3 | 735 | 1 | 3.8 | 0 | 8015 | 27.5 | Clear colorless liquid |

TABLE 2-continued

| Example | Molecular weight Mn [g/mol] | Oxamidoester groups | Alkyl groups per oxamidoester group | Alkoxy groups per oxamidoester group | Viscosity [mPas] | Yield [g] | Appearance |
|---|---|---|---|---|---|---|---|
| 4 | 721 | 1 | 5.3 | 0 | | 23.4 | Clear colorless liquid |
| 5 | 753 | 1 | 8.1 | 0 | | 22.4 | Clear colorless liquid |
| 6 | 697 | 1 | 14.4 | 0 | | 18.8 | Clear colorless liquid |
| 7 | 853 | 1 | 2.6 | 0 | | 25.3 | Clear colorless liquid |
| 8 | 875 | 1 | 4.3 | 0 | | 22.6 | Clear colorless liquid |
| 9 | 853 | 1 | 7.3 | 0 | | 21 | Clear colorless liquid |
| 10 | 932 | 1 | 2.4 | 0.05 | | 23.8 | Clear colorless liquid |
| 11 | 886 | 1 | 3.5 | 0 | | 22.3 | Clear colorless liquid |
| 12 | 886 | 1 | 4.1 | 0.13 | | 21.5 | Clear colorless liquid |
| 13 | 918 | 1 | 5.9 | 0 | | 21.4 | Clear colorless liquid |
| 14 | 827 | 1 | 3.2 | 0.02 | | 26.5 | Clear colorless liquid |
| 15 | 766 | 1 | 5 | 0 | | 24.2 | Clear colorless liquid |
| 16 | n.d. | 1 | 2 | 0 | 508 | 36.2 | Clear colorless liquid |
| 17 | n.d. | 1 | 2 | 0 | 519 | 35.7 | Clear colorless liquid |

The siloxanes obtained according to the invention are clear colorless condensation products, in some cases having high viscosities due to the presence of the oxamidoester groups.

The invention claimed is:

1. A method for preparing siloxanes having oxamidoester groups, comprising:
reacting
(A) silanes of the formula

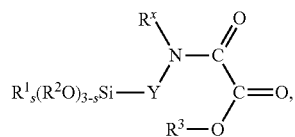

(II)

optionally (B) silanes of the formula $R^4{}_t(R^5O)_{4-t}Si$ (III)

and (W) water,
where
$R^1$ each independently are monovalent, optionally substituted, SiC-bonded hydrocarbon radicals that may be interrupted by heteroatoms,
$R^2$ each independently are hydrogen or monovalent, optionally substituted hydrocarbon radicals optionally interrupted by heteroatoms,
$R^3$ each independently are monovalent, optionally substituted hydrocarbon radicals optionally interrupted by oxygen atoms,
$R^x$ each independently are hydrogen or optionally substituted hydrocarbon radicals,
Y each independently are divalent, optionally substituted hydrocarbon radicals optionally interrupted by oxygen atoms or nitrogen atoms,
$R^4$ each independently are monovalent, optionally substituted, SiC-bonded hydrocarbon radicals optionally interrupted by heteroatoms,
$R^5$ each independently are hydrogen or monovalent, optionally substituted hydrocarbon radicals optionally interrupted by heteroatoms,
s is 0, 1 or 2 and
t is 0, 1, 2 or 3.

2. The method of claim 1, wherein silanes of the formula (II) where s is 1 or 2 are employed.

3. The method of claim 1, wherein silanes of the formula (III) are employed.

4. The method of claim 2, wherein silanes of the formula (III) are employed.

5. The method of claim 1, wherein water (W) is used in amounts of 0.4 to 10 times molar excess based on the total number of reactive —$OR^2$ and —$OR^5$ groups in the silanes (A) and (B) used.

6. The method of claim 1, wherein silanes of the formula (II), where $R^1$ is a methyl radical, $R^x$ is a hydrogen atom, Y is —$C_3H_6$—, s is 1 or 2, $R^2$ is a methyl or ethyl radical, and $R^3$ is an ethyl radical, are reacted, in the absence of catalyst (C), with (B) silanes of the formula (III), where $R^4$ is a methyl radical and $R^5$ is a methyl or ethyl radical and t is 2 or 3.

7. The method of claim 1, wherein siloxanes having 2 to 1000 silicon atoms are obtained as a product.

8. A siloxane comprising units of the formula $X_aR_b(R^6O)_cSiO_{4-a-b-c/2}$ (I)

where
R are identical or different and are each independently are monovalent, optionally substituted, SiC-bonded hydrocarbon radicals optionally interrupted by heteroatoms,
$R^6$ are identical or different and are each independently are hydrogen or monovalent, optionally substituted hydrocarbon radicals optionally interrupted by heteroatoms,
X represents a radical

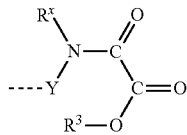

where $R^x$, Y, and $R^3$ are as defined above,
$R^x$ each independently are hydrogen or optionally substituted hydrocarbon radicals,
Y each independently are divalent, optionally substituted hydrocarbon radicals optionally interrupted by oxygen atoms or nitrogen atoms,
$R^3$ each independently are monovalent, optionally substituted hydrocarbon radicals optionally interrupted by oxygen atoms,
a is 0 or 1,
b is 0, 1, 2 or 3, and c is 0, 1, 2 or 3, with the proviso that the sum a+b+c is less than or equal to 3 and each molecule contains at least one unit of the formula (I) where a is 1 and the sum b+c is 0 or 1.

9. The siloxane of claim 8, consisting of units of the formula (I).

10. The siloxanes of claim 8, wherein the sum a+b+c is 2 in at least 50% of the units of the formula (I).

11. The siloxanes of claim 9, wherein the sum a+b+c is 2 in at least 50% of the units of the formula (I).

* * * * *